United States Patent [19]
Cusick et al.

[11] Patent Number: 5,993,501
[45] Date of Patent: Nov. 30, 1999

[54] COMPOSITE FILTER MEDIA

[75] Inventors: Michael John Cusick, Englewood; Fred Lee Jackson, Littleton, both of Colo.; Charles Francis Kern, Marietta, Ohio; Craig Donald DePorter, Denver, Colo.

[73] Assignee: Johns Manville International, Inc., Denver, Colo.

[21] Appl. No.: 09/024,908

[22] Filed: Feb. 17, 1998

Related U.S. Application Data

[62] Division of application No. 08/747,172, Nov. 8, 1996, Pat. No. 5,800,586.

[51] Int. Cl.$^6$ .................................................. B01D 46/52
[52] U.S. Cl. ............................... 55/486; 55/487; 55/524; 55/527; 55/528; 210/506; 210/509; 428/182; 428/184
[58] Field of Search ........................ 95/286, 287; 55/486, 55/487, 524, 527, 528, 497, 521; 428/181, 182, 184; 210/488, 490, 491, 493.1, 493.5, 506, 508, 509

[56] References Cited

U.S. PATENT DOCUMENTS

| | | | |
|---|---|---|---|
| 3,853,529 | 12/1974 | Boothe et al. | 55/521 |
| 4,728,349 | 3/1988 | Oshitari | 55/487 |
| 4,765,915 | 8/1988 | Diehl | 55/524 |
| 4,961,974 | 10/1990 | Jones | 55/524 |
| 4,983,193 | 1/1991 | Tani et al. | 55/527 |
| 5,269,925 | 12/1993 | Broadhurst | 55/524 |
| 5,283,106 | 2/1994 | Seiler et al. | 55/527 |
| 5,288,402 | 2/1994 | Yoshida | 55/486 |
| 5,306,321 | 4/1994 | Osendorf | 55/487 |
| 5,397,632 | 3/1995 | Murphy, Jr. et al. | 55/521 |
| 5,427,597 | 6/1995 | Osendorf | 55/487 |
| 5,472,467 | 12/1995 | Pfeffer | 55/527 |
| 5,480,466 | 1/1996 | Jackson et al. | 55/528 |
| 5,588,976 | 12/1996 | Miller | 55/524 |
| 5,607,491 | 3/1997 | Jackson et al. | 55/528 |
| 5,614,095 | 3/1997 | Degen et al. | 55/486 |
| 5,800,586 | 9/1998 | Cusick et al. | 55/486 |

*Primary Examiner*—Duane S. Smith
*Attorney, Agent, or Firm*—Robert D. Touslee

[57] ABSTRACT

A composite filter media includes a fibrous filtration layer of randomly oriented fibers and one or more pleatable stiffening layers which enable the composite filter media to be pleated and hold or retain its pleats. The pleatable stiffening layer(s) may enhance the dirt holding capacity of the composite filter media especially when positioned upstream of the fibrous filtration layer. The composite filter media may also include a flexible covering layer which functions to block the loss of fibers from the fibrous filtration layer. Preferably, the mean fiber diameter of the fibers in fibrous filtration layer increases and the density of the fibrous filtration layer decreases throughout the thickness of the fibrous filtration layer from one major surface to the other major surface of the fibrous filtration layer.

8 Claims, 4 Drawing Sheets

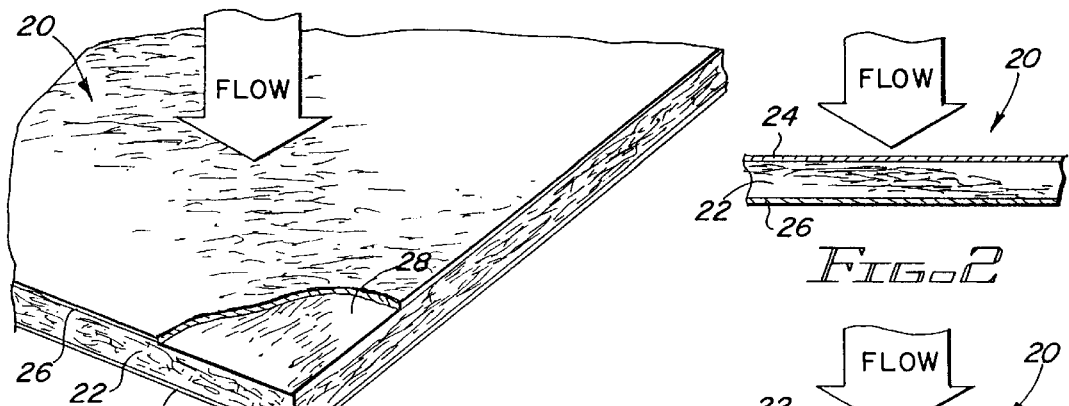
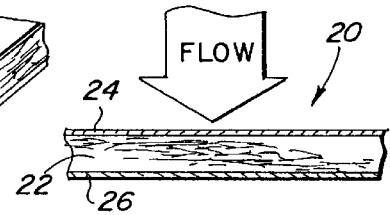
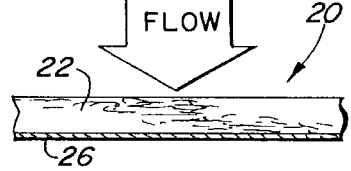
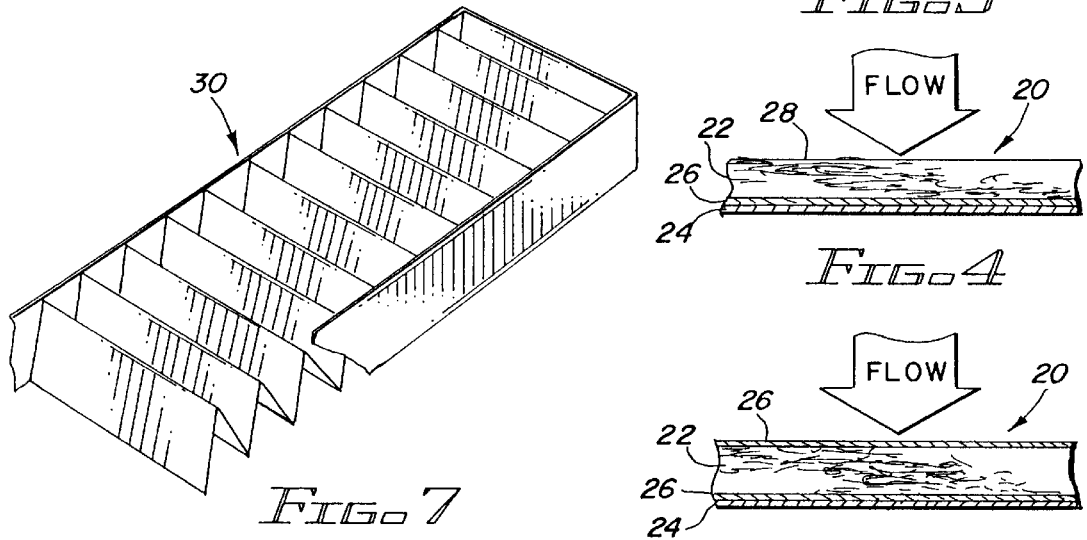
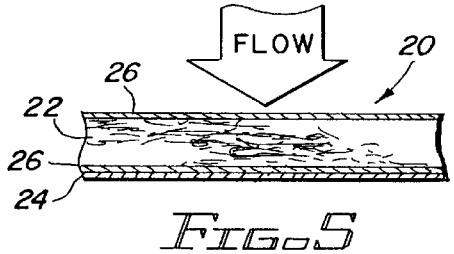
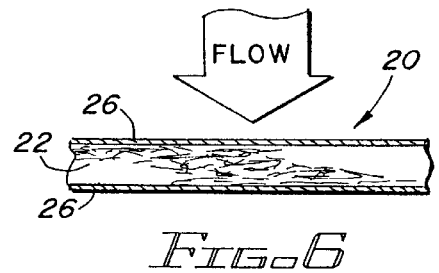
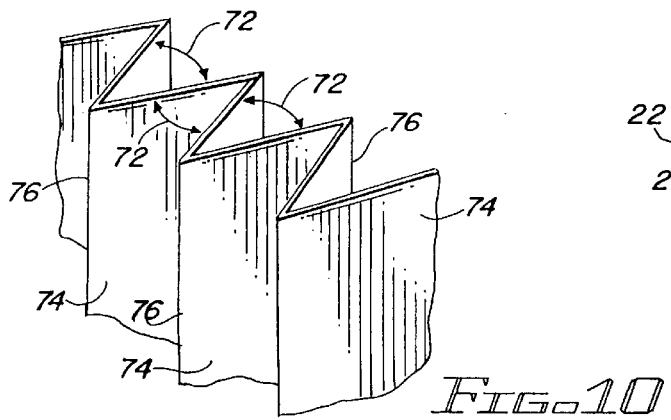

| | Microfiber Binder | Media Wt. (g/ft²) | Thickness (") | Initial ΔP ("WC) | Ave. ΔP ("WC) | Initial Efficiency (%) | Average Efficiency (%) | Dirt Holding (g/4ft²) | Taber Machine Stiffness | Taber X-Machine Stiffness |
|---|---|---|---|---|---|---|---|---|---|---|
| 85% ASHRAE Media (Vendor #1) | Acrylic | 7.0 | 0.030 | 0.40 | 0.63 | 65.5 | 83.3 | 2.5 | 8.4 | 7.1 |
| 85% ASHRAE Media (Vendor #2) | Acrylic | 7.2 | 0.030 | 0.36 | 0.61 | 52.8 | 78.1 | 2.5 | 2.6 | 2.8 |
| Composite #1 (Stiff Upstream) | Latex | 12.9 | 0.080 | 0.20 | 0.48 | 58.5 | 84.9 | 7.9 | 10 | 10 |
| Composite #4 (Stiff Downstream) | Latex | 8.6 | 0.090 | 0.20 | 0.48 | 50.0 | 79.8 | 6.0 | 6.5 | 2.8 |

Composite #1: High Air-Perm Thick Stiffening Layer Upstream
Composite #4: Low Air Perm Thin Stiffening Layer Downstream

Fig. 12

| Composite Materials | | Weight (gsf) | Thickness (in) | Frasier Air Perm.(cfm/ft²) | Binder Content(wt%) | Dirt Holding Ratio |
|---|---|---|---|---|---|---|
| COMPOSITE #1 | Materials | | | | | |
| Stiffening Layer | PVC-Bonded Glass/Polyester Mat | 9.8 | 0.032 | 630 | 20% PVC | |
| Coarser-to-Fine Fibers | Fines collect on covering layer | 1.8 | 0.043 | 100 | 20% Latex | |
| Covering Layer | Polyester | 1.3 | 0.005 | 1400 | Spunbond | |
| Composite | | 12.9 | 0.080 | | | 1.5 |
| COMPOSITE #2 | | | | | | |
| Covering Layer | Polyester | 1.3 | 0.005 | 1400 | Spunbond | |
| Coarser-to-Fine Fibers | Fines collect on stiffening layer | 2.3 | 0.093 | 100 | 20% Phenolic | |
| Stiffening Layer | PVC Bonded Glass Polyester Mat | 9.8 | 0.032 | 630 | 20% PVC | |
| Composite | | 13.4 | 0.130 | | | 1.1 |
| COMPOSITE #3 | | | | | | |
| Stiffening Layer | Polyester | 6.3 | 0.013 | 265 | Spunbond | |
| Coarser-to-Fine Fibers | Fines collect on covering layer | 2.3 | 0.052 | 100 | 20% Latex | |
| Covering Layer | Polyester | 1.3 | 0.005 | 1400 | Spunbond | |
| Composite | | 9.9 | 0.070 | | | 1.3 |
| COMPOSITE #4 | | | | | | |
| Covering Layer | Polyester | 1.3 | 0.005 | 1400 | Spunbond | |
| Coarser-to-Fine Fibers | Fines collect on stiffening layer | 1.6 | 0.070 | 100 | 20% Latex | |
| Stiffening Layer | Rayon/Polyester Mix | 5.7 | 0.015 | 390 | 10% Latex | |
| Composite | | 8.6 | 0.090 | | | 0.7 |

Dirt Holding(Stiff-side upstream) over Dirt Holding(Stiff-side downstream)

FIG. 13

COMPOSITE FILTER MEDIA

This application is a division of application Ser. No. 08/747,172, filed Nov. 8, 1996, now U.S. Pat. No. 5,800,586.

BACKGROUND OF THE INVENTION

The present invention relates to composite filter media and, in particular, to low, medium and high efficiency pleatable composite filter media which include either a low, medium or high efficiency fibrous filtration layer of randomly oriented fibers; and one or more permeable stiffening layers which enable the composite filter media to be pleated and retain its pleats.

Filtration devices such as vehicle passenger compartment air filters, high performance engine air filters, engine oil filters, ASHRAE pleatable filters and the like typically use a pleated high efficiency filtration media for the filtration element. Currently, the pleated high efficiency media normally used in these filtration devices are made from ASHRAE filter media or paper products. These paper products are made by a wet-laid technique wherein fibers, e.g. glass fibers, cellulose and/or polymeric fibers, are dispersed in a water or binder slurry which is stirred to cause the fibers to become thoroughly and randomly mixed with each other. The fibers are then deposited from the water or binder slurry onto a conventional paper making screen or wire as in a Fourdrinier machine or a Rotoformer machine to form a matted paper. The paper formed from the fibers is then dried and wound up into a roll or otherwise collected in a conventional manner for further processing, such as being cut into selected sizes and pleated to form the filtration elements for various types of air, gas and liquid filters. The pleated filter elements made from such papers can exhibit high efficiencies. However, these pleated filter elements have low dirt-holding capacities and exhibit high pressure drops. Accordingly, there has been a need to provide a relatively low cost, high efficiency filter media for these filtration applications which exhibit relatively high dirt-holding capacities and relatively low pressure drops as well as low and medium efficiency filter media which exhibit relatively high dirt-holding capacities and relatively low pressure drops.

SUMMARY OF THE INVENTION

The present invention relates to low cost composite filter media which have: a) the requisite formability and stiffness or rigidity to enable the composite filter media to be scored and pleated and to hold or retain their pleats; b) relatively high dirt-holding capacities; and c) relatively low pressure drops across the composite filter media. Due to the relatively high dirt holding capacities and low pressure drops across the composite filter media of the present invention, pleated filters made with the pleated filter media of the present invention require less filter media to obtain the same performance characteristics as pleated filters made with previous filter media. While the present invention is especially suited for high efficiency composite filter media, the present invention is also directed to low and medium efficiency filter media.

The composite filter media of the present invention includes a low, medium or high efficiency fibrous filtration layer of randomly oriented fibers (e.g. mineral fibers such as fine glass fibers); one or more formable stiffening layers which enable the composite filter media to be scored and pleated and to hold or retain its pleats; and preferably, a covering layer or a second stiffening layer. When the fibrous filtration layer is sandwiched between a stiffening layer and a covering layer or a pair of stiffening layers, the stiffening and covering layers function to protect the fibrous filtration layer from abrasion. The covering layer also functions to block the loss of fibers from the fibrous filtration layer when the composite filter media is being scored and pleated and, as a downstream layer of the composite fibrous filter media, to block the loss of fibers from the fibrous filtration layer when a fluid being filtered passes through the composite filter media. As the upstream layer of the composite filter media, the stiffening layer can also enhance the dirt-holding capacity of the composite filter media.

A binder, adhesive or other bonding means bonds the fibers of the fibrous filtration layer together and the layers of the composite together. The binder must be sufficiently formable or ductile to permit the composite filter media to be scored or creased and pleated without delaminating the layers of the composite and with little or substantially no breakage of the fiber to fiber bonds within the fibrous filtration layer.

The stiffening layer(s) must be sufficiently formable or ductile to be scored or creased and pleated without fracturing or failing and at the same time sufficiently rigid or stiff to hold or retain the composite filter media in a pleated configuration once the composite filter media has been folded or formed into the pleated configuration. The covering layer, when used, is preferably a very thin flexible membrane selected to protect the fibrous filtration layer from abrasion and fiber loss.

Preferably, the fibrous filtration layer of the composite filter media is air laid and made up of randomly oriented flame attenuated mineral fibers, such as fine glass fibers, which are bonded together at their intersections with a binder which permits the fibrous filtration layer to be pleated with little breakage of the fiber to fiber bonds within the fibrous filtration layer. Preferably, the fibrous filtration layer ranges in weight from about 1.4 grams per square foot for the more efficient filter media to about 4.0 grams per square foot for the less efficient filter media, with the binder content of the fibrous filtration layer ranging from about 10% to about 25% of the layer weight, and the mean diameter of the fibers, forming the fibrous filtration layer, ranges from about $3.0 \times 10^{-5}$ inches for the more efficient filter media to about $11.0 \times 10^{-5}$ inches for the less efficient filter media.

For certain applications, low curing temperature ductile binders are used to bond the fibers of the fibrous filtration layers together and the different layers of the composite together. The use of these low curing temperature binders enables the composite filter media of the present invention to be made with numerous facing materials, such as but not limited to, inexpensive polypropylene, rayon, blended rayon-polyester and bi-component fiber scrim facing materials as well as the more expensive glass, polyester, and nylon fiber scrim materials and blends of these materials. However, when binders, such as phenolic binders, with higher curing temperatures are used as the bonding agent for the composite filter media, the composite filter media is made with the higher temperature resistant facing materials, such as but not limited to, glass, polyester, nylon fiber scrim materials, and blends of these materials.

BRIEF DESCRIPTION OF THE DRAWINGS

FIG. 1 is a schematic perspective of a first embodiment of the composite filter media of the present invention with a pleatable stiffening layer as the upstream layer and a covering layer as the downstream layer of the composite filter media.

FIG. 2 is a schematic section through a second embodiment of the composite filter media of the present invention with a covering layer as the upstream layer and a pleatable stiffening layer as the downstream layer of the composite filter media.

FIG. 3 is a schematic section through a third embodiment of the composite filter media of the present invention with a pleatable stiffening layer as the downstream layer of the composite filter media.

FIG. 4 is a schematic section through a fourth embodiment of the composite filter media of the present invention with a covering layer as the downstream layer of the composite filter media and a pleatable stiffening layer intermediate the fibrous filtration layer and the covering layer.

FIG. 5 is a schematic section through a fifth embodiment of the composite filter media of the present invention with a pleatable stiffening layer as the upstream layer; a covering layer as the downstream layer and a second pleatable stiffening layer intermediate the fibrous filtration layer and the downstream covering layer.

FIG. 6 is a schematic section through a sixth embodiment of the composite filter media of the present invention with pleatable stiffening layers as the upstream stiffening layer and the downstream stiffening layer.

FIG. 7 is a schematic perspective view, with a portion broken away, of a pleated vehicle passenger compartment air filter using the composite filter media of the present invention.

FIG. 10 is a fragmentary perspective view of a pleated filter media of the present invention.

FIG. 12 is a table comparing the performance of composite filter media #1 and #4 of FIG. 13 with previously available wet-laid ASHRAE filter media or paper.

FIG. 13 is a table comparing the performance of various embodiments of the composite filter media of the present invention.

DESCRIPTION OF THE PREFERRED EMBODIMENTS

Figure 8:
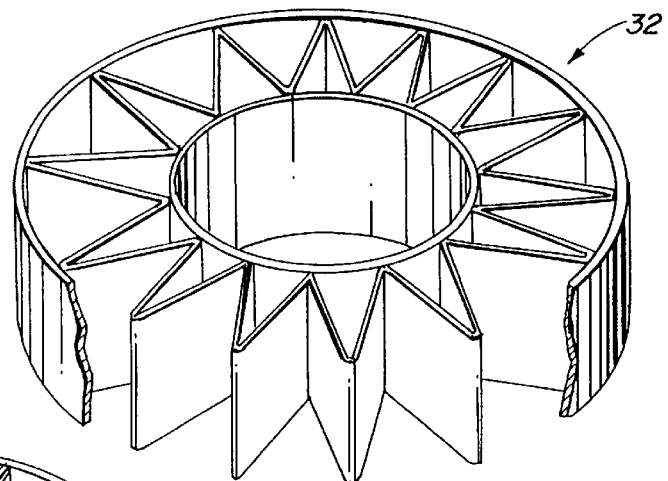
FIG. 8 is a schematic perspective view, with a portion broken away, of a pleated engine air filter using the composite filter media of the present invention.

The composite filter media 20 of the present invention includes a thin fibrous filtration blanket or layer 22 of randomly oriented fibers and one or more permeable, pleatable stiffening layers 26 which enable the composite filter media 20 to be scored or creased, pleated and retain its pleats. The composite filter media 20 may also include a thin, permeable, flexible covering layer 24 to protect the fibrous filtration layer 22 from abrasion and block the loss of fibers from the fibrous filtration layer 22. The downstream layer of the composite filter media 20 may be a permeable, pleatable stiffening layer 26; a permeable, flexible covering layer 24; or a laminate of a permeable, pleatable stiffening layer 26 and a permeable, flexible covering layer 24. FIGS. 1–6 show different embodiments of the composite filter media 20 of the present invention with the fibrous filtration layer 22 and the permeable, pleatable stiffening layer or layers 26 arranged within the composite in various combinations and the inclusion of the permeable, flexible covering layer 24 in selected embodiments.

Preferably, the thin fibrous filtration layer 22 is made of air-laid randomly oriented mineral fibers (e.g. glass fibers) which are bonded together at their points of intersection by a binder. The thin fibrous layers 22, while preferably increasing in density and decreasing in mean fiber diameter from their upstream surface 28 to their downstream surface, are substantially uniform in density and thickness throughout their length and width and are essentially free of macroscopic voids which would permit portions of an air, gas or other fluid stream being filtered to pass through the fibrous filtration layers 22 essentially unfiltered. With their substantially uniform density and thickness, the thin fibrous layers 22 provide consistent or substantially consistent filtration performance over their entire surface areas.

The fibrous filtration layers 22 normally have average air filtration efficiencies ranging from about 20% to about 95%. The fibrous filtration layers 22 range in weight from about 1.4 grams per square foot for the more efficient filter media to about 4.0 grams per square foot for the less efficient filter media, with the binder content of the fibrous filtration layer ranging from about 10% to about 25% of the layer weight, and the mean diameter of the fibers, forming the fibrous filtration layer, ranges from about $3.0 \times 10^{-5}$ inches for the more efficient filter media to about $11.0 \times 10^{-5}$ inches for the less efficient filter media.

In embodiments of the composite filter media 20 having average air filtration efficiencies of about 80% or greater, the mean diameter of the fibers forming the fibrous filtration layer 22, preferably, ranges from $3.0 \times 10^{-5}$ to $4.1 \times 10^{-5}$ inches.

Fibers having an average diameter less than $3.0 \times 10^{-5}$ inches are generally too short and fragile to provide the fibrous layer 22 with the integrity required for most applications. Fibers having an average diameter over $4.1 \times 10^{-5}$ inches are generally to large in diameter to provide the required average air filtration efficiencies for the high efficiency fibrous filtration layers used in the composite filtration media 20 of the present invention. Preferably, the high efficiency fibrous filtration layers 22 are between about 10% and 25% by weight binder; weigh from about 1.4 to about 2.5 grams per square foot; and range in thickness from about 0.035 to about 0.12 inches. The initial pressure drops across the thicknesses of the high efficiency fibrous filtration layers 22 ranges from no greater than 0.15 inches of water and preferably no greater than 0.12 inches of water at the lower efficiency levels to no greater than 0.30 inches of water and preferably no greater than 0.25 inches of water at the higher efficiency levels.

In one high efficiency embodiment of the present invention, the fibrous filtration layer 22 of the composite filter media 20 is made of fibers (preferably flame attenuated glass fibers) having a mean diameter between about $3.3 \times 10^{-5}$ and about $4.1 \times 10^{-5}$ inches. The fibrous filtration layer 22 weighs between about 1.4 and about 2.2 grams per square foot and has an average air filtration efficiency of at least 80% and preferably, about 85%. The initial pressure drop across the thickness of the fibrous filtration layer 22 is no greater than 0.15 inches of water and preferably, no greater than 0.12 inches of water.

Preferably, the fibrous filtration layer 22 ranges in thickness from about 0.035 to about 0.12 inches and typically, has a dust holding capacity of about 10 to about 12 grams.

In another high efficiency embodiment of the present invention, the fibrous filtration layer 22 is made of fibers (preferably flame attenuated glass fibers) having an average diameter between about $3.0 \times 10^{-5}$ and about $3.7 \times 10^{-5}$ inches. The fibrous filtration layer 22 weighs between about 1.7 and 2.5 grams per square foot and has an average air filtration efficiency of at least 90% and preferably, about 95%. The initial pressure drop across the thickness of the fibrous filtration layer 22 is no greater than 0.30 inches of water and preferably, no greater than 0.25 inches of water. Preferably, the fibrous filtration layer 22 ranges in thickness from about 0.035 to about 0.12 inches and typically, has a dust holding capacity of about 10 to about 12 grams.

The preferred fibers for the fibrous filtration layer 22 are flame attenuated glass fibers. These fibers are formed by drawing continuous primary glass filaments from a conventional feeder or pot and introducing these continuous primary glass filaments into the high energy gaseous blast of a flame attenuation burner, e.g. a Selas burner, where the continuous filaments are reheated, attenuated and formed into fine diameter staple or discrete length glass fibers of the desired diameter within the aforementioned diameter ranges. A binder is then sprayed onto the staple fibers and the fibers are collected to form the fibrous filtration layer 22 of randomly oriented fibers, e.g. on a moving chain, collection conveyor.

In the preferred methods of making the composite filter media 20, the fibrous filtration layer 22 is collected on a backing layer 60 which is: i) a lightweight, flexible, permeable covering layer 24; ii) a permeable, pleatable stiffening layer 26; or iii) a laminate of a permeable, flexible covering layer 24 and a permeable, pleatable stiffening layer 26 which is superimposed on a collection conveyor. When the fibrous filtration layer 22 is collected on a permeable, flexible covering layer 24, the covering layer 24 facilitates the handling of the fibrous filtration layer 22; increases the integrity of the fibrous filtration layer 22; minimizes fiber loss through the collection chain; and, as part of the composite filter media 20, contributes to particulate filtration and blocks the loss of fibers from the fibrous filtration layer 22 so that substantially no fibers from the fibrous filtration layer 22 are carried away by the gas or liquid stream being filtered. When the fibrous filtration layer 22 is collected on a permeable, pleatable stiffening layer 26, the permeable, pleatable stiffening layer 26 typically performs the same functions as the covering layer 24 and in addition enables the composite filter media 20 to be scored, pleated and retain its pleats.

Preferably, the fibers are collected on the backing sheet or layer 60 to form the fibrous filtration layer 22 with the finer fibers of the fibrous filtration layer 22 lying predominately adjacent the backing layer 60 and the coarser fibers of the fibrous filtration layer 22 lying predominately adjacent the upstream surface 28 of the fibrous filtration layer 22 thereby providing a graded fibrous filtration layer 22 which ranges from coarser fibers at the upstream surface 28 to finer fibers at the backing layer 60. When the upper surface of the fibrous filtration layer 22, as collected, functions as the upstream, intake or dirty side of the fibrous filtration layer 22 in the composite filter media 20, the coarser fibers in this less dense portion of the fibrous filtration layer 22 at and adjacent the upstream, intake or dirty side of the filter media catch and retain the largest particles from the air, gas or other fluid stream being filtered and prevent these particles from closing the smaller voids between the finer fibers in the more dense portion of the fibrous filtration layer 22 at and adjacent the backing layer 60. Thus, the collection of the coarser fibers at and adjacent the upstream surface 28 of the fibrous filtration layer 22 increases the dirt-holding capacity of the fibrous filtration layer 22 and the composite filter media 20 and the collection of the finer fibers at and adjacent the backing layer 60, increases the filtration efficiency of the fibrous filtration layer 22 and the composite filter media 20.

While flame attenuated glass fibers are preferred, other fibers may be used to form the fibrous filtration layer 22, such as glass fibers produced on rotary fiberization processes and polyester, polypropylene and other polymeric fibers including melt blown polymeric fibers. The fiber diameters set forth in this specification are measured by a micronaire flow resistance test. While it is preferred to bond the randomly oriented fibers of the fibrous filtration layer 22 together with a binder, and most preferably, a low curing temperature, ductile binder, other means of bonding the fibers together may be used provided there is substantially no breakage of the fiber to fiber bonds within the fibrous filtration layer 22 when the composite filter media 20 is scored and pleated e.g. perhaps certain thermoplastic fibers could be bonded at their intersections by heat bonding the fibers directly together and pleated when heated. When polymeric fibers are used to form the fibrous filtration layer 22, the fibrous filtration layer is typically binderless. Preferably, the polymer fibers of the fibrous filtration layer 22 are bonded together by heat bonding, ultrasonic bonding, or similar bonding techniques and the fibrous filtration layer is bonded to other layer of the composite by using an adhesive web or the like.

Preferably, the binders used to bond the fibers of the fibrous filtration layer 22 are low cost, low curing temperature (curing at temperatures of 350° F. and below and preferably 300° F. and below) ductile binders which provide excellent adhesion between the fibers of the fibrous filtration layer 22 and between the fibrous filtration layer 22 and the backing layer 60 and any upstream layer or layers 24 or 26. The use of binders or adhesives which are ductile after the binders or adhesives have been cured permits the composite filter media 20 to be readily reformed from the flat or substantially flat composite sheets shown in FIGS. 1–6 into pleated filter media such as the pleated filter media shown in FIGS. 7–10 with little or substantially no breakage of the fiber to fiber bonds within fibrous layer 22 or the bonds between the various layers 22, 24 and 26 of the composite filter media 20. Accordingly, when the composite filter media 20 is creased or scored during a pleating operation and folded or doubled over on itself, there is little or no fracturing of the fibrous filtration layer 22 or separation of the composite layers 22, 24 and 26 at the crease or score line.

A phenolic binder, such as a standard phenolic binder commonly used in the glass fiber insulation and paper industries, can be used to make the composite filter media 20. However, these types of binders require a high cure temperature, e.g. about 400° F. and above. Thus, relatively high temperature resistant mat or scrim covering and stiffening layers, such as but not limited to glass, polyester, and nylon covering sheets and glass, polyester, and nylon stiffening sheets, should be used to form the covering and stiffening layers 24 and 26 in composite filter media 20 bonded together with such phenolic binders or adhesives. In addition, such phenolic binders have relatively high $T_g$ values when cured and accordingly exhibit relatively low ductility after the binders have been cured. When cured, undyed phenolic binders give the fibrous filtration blanket 22 a yellow or tan appearance.

To give the fibrous filtration layer 22 a white appearance, a high $T_g$ acrylic binder is more acceptable than the phenolic binders. However, like the phenolic binders, these acrylic binders have a relatively high curing temperature and should be used with relatively high temperature resistant mat or scrim covering and stiffening layers such as the polyester covering sheets and stiffening sheets discussed above. High temperature resistant covering and stiffening sheets, such as polyester covering and stiffening sheets, are more expensive than other readily available facing materials which can be used for the covering and stiffening sheets, such as but not limited to, low temperature polypropylene sheets. Thus, the use of more expensive covering and stiffening sheets such as polyester covering and stiffening sheets detracts somewhat from the cost savings provided by the composite filter media 20 and the method of making the composite filter media 20.

To give the fibrous layer 22 a white appearance and to reduce volatile emissions during the manufacturing process, low cost, low curing temperature, acrylic latex and other resin binders having low $T_g$ values, such as but not limited to, acrylic emulsions, ethylene/vinyl acetate copolymer emulsions or SBR emulsions, are used to bond the fibers in the fibrous filtration layer 22 and the layers 22, 24 and 26 of the composite filter media together. These low cost binders are ductile and provide excellent adhesion between the fibers of the fibrous filtration layer 22 and the layers of the composite filter media 20, especially, when glass fibers and either polypropylene or polyester covering layers 24 and stiffening layers 26 are used to form the composite filter media 20.

The use of such binders is particularly beneficial in a hot-pleating operation. When using such resin binders, the composite filter media 20 can be heated to promote binder ductility and then set to hold the pleats. While less ductile binders such as phenolic binders can be used as the binders in the composite filter media 20, as mentioned above the flexible nature of these ductile or low $T_g$ value binders allows the score lines or creases for the pleats to be more easily formed in the composite filter media 20 with little or substantially no breakage of the fiber to fiber bonds within the fibrous filtration layer 22 or delamination of the layers of the composite filter media 20. Thus, the composite filter media 20 neither fractures nor delaminates at the pleat creases or score lines.

As discussed above the lightweight, flexible, permeable covering layer 24 facilitates the handling of the fibrous filtration layer 22; increases the integrity of the fibrous filtration layer 22 by reinforcing the fibrous filtration layer 22; when collected on, minimizes fiber loss through the collection chain as the fibrous filtration layer 22 is being formed; and, as the downstream layer of the composite filter media 20, blocks the loss of fibers from the fibrous filtration layer 22 so that substantially no fibers from the fibrous filtration layer 22 are carried away by the gas or liquid stream being filtered. Otherwise, the permeable, flexible covering layer 24 adds little to the filtration efficiency or dirt-holding capacity of the composite filtration media 20. Typically, the permeable, flexible covering layer 24 is a permeable sheet, such as, but not limited to, a flexible, light weight (e.g. 1.3–1.6 grams per square foot), non-woven, open mesh scrim of polyester, polypropylene, nylon, glass or similar fibrous materials or blends of such fibrous materials. One preferred permeable, flexible covering layer 24 is a low cost spun-bond polyester or polypropylene covering sheet, weighing about a 1.3 grams per square foot, which can be used in the composite filter media 20 due to the use of the low cure temperature binders described above. These lightweight permeable covering layers 24 are pliable or flexible; do not inhibit the pleating of the composite filter media 20; and preferably have a tight structure to block the loss of fibers from the fibrous filtration layer 22.

The formable, permeable stiffening layer or layers 26 of the composite filter media 20 are preferably not only formable but also sufficiently stiff to permit the stiffening layer(s) 26 and the composite filter media 20 to be reformed and pleated during a pleating process and to hold those pleats after the pleating process is completed with no fracturing or failure of the stiffening layer(s) 26. The stiffening layer 26 preferably exhibits a low pressure drop and may be made from various permeable sheets, such as, but not limited to, 1.3–11.4 grams per square foot non-woven, spun bonded or carded, wet laid, open mesh scrim sheets or mats of polyester, polypropylene, nylon, glass or similar fibrous materials or blends of such fibrous materials. Two preferred pleatable stiffening layers 26 are a low cost polyvinyl chloride fiber bonded glass/polyester fiber formable stiffening sheet, weighing about 9.8 grams per square foot and a rayon/polyester fiber formable stiffening sheet weighing about 5.7 grams per square foot.

As shown in the table of FIG. 12, various embodiments of the composite filter media 20 were tested relative to two commercial ASHRAE paper filter media. The embodiments of the composite filter media 20 tested included both the embodiment of FIG. 1 wherein the stiffening layer 26 is located on the intake, upstream or dirty side of the composite filter media 20 and the embodiment of FIG. 2 wherein the stiffening layer 26 is located on the output, downstream or clean side of the composite filter media 20. As shown by the results set forth in the table of FIG. 12, for comparable efficiencies, the initial and average pressure drops across the composite filter media 20 of the present invention were considerably lower than the wet-laid ASHRAE paper filter media (e.g. about 75% to about 80% of the average pressure drop across the ASHRAE paper filter media) and the dirt-holding capacities of the composite fiber media 20 of the present invention were much higher than the dirt-holding capacities of the wet-laid ASHRAE paper filter media (e.g. up to 250% more) especially, when the stiffening layer 26 was positioned upstream of the fibrous filtration layer 22.

The efficiency ratings given to the fibrous filtration layers 22 of the composite filtration media 20 of the present invention are based on the following testing procedure. An air stream, with 0.3 to 0.5 micron mineral oil droplets, is passed through a two foot square section of the fibrous filtration layer 22 at a velocity of twenty-five feet per minute. The number of droplets in the air stream, upstream of the fibrous filtration layer 22, is compared to the number of droplets in the air stream, downstream of the fibrous filtration layer 22, to determine the efficiency. The initial efficiency rating for the fibrous filtration layer 22 is the efficiency measured at the beginning of the test run with no dust or dirt loading.

During the testing procedure, dust particles are added to the fibrous filtration layer 22 section by passing an air stream containing the dust particles through the fibrous filtration layer section at a velocity of twenty-five feet per minute. When the pressure drop across the fibrous filtration layer 22 reaches one inch of water column, the fibrous filtration layer is considered plugged and the test is completed. The average air filtration efficiency rating for the fibrous filtration layer 22 is an average of the measured air filtration efficiencies of the fibrous filtration layer 22 as measured when the pressure drop across the fibrous filtration layer reaches certain levels during the test. The efficiency measurements made to determine the average air filtration efficiency of the fibrous filtration layer 22 are made: at the beginning of the test, at the end of the test (when the pressure drop across the fibrous filtration layer is one inch of water column), and when the dust loading of the fibrous filtration layer causes the pressure drops, across the fibrous filtration layer 22, to be at the following levels: 25%, 50% and 75% of the way between the initial pressure drop across the fibrous filtration layer 22 and the final pressure drop across the fibrous filtration layer 22 of one inch of water column. This average efficiency rating is referred to in this specification as the "average air filtration efficiency" of the fibrous filtration layer 22.

The efficiency ratings given to the composite filter media 20 of the present invention are based on the same efficiency testing procedure as applied to the fibrous filtration layer 22. A two foot square section of the composite filter media 20 is tested. The initial efficiency rating for the composite filter media 20 is the efficiency measured at the beginning of the test run with no dust loading of the composite filter media. The average efficiency rating for the composite filter media 20 is derived like the average efficiency rating for the fibrous filtration layer 22 and is referred to in this specification as the "average air filtration efficiency" of the composite filter media 20. As with the fibrous filtration layer 22, when the pressure drop across the composite filter media reaches one inch of water column, the composite filter media is considered plugged and the test is completed.

The above discussed efficiency measurements are based on the mechanical trapping of dust particles by: a) the fibrous filtration layer 22 or b) the composite filter media 20 and are not based on efficiencies which can be obtained, with certain filtration media, by means of an electrostatic charge on the fibers of the filtration media attracting and capturing charged dust particles present in an air or gas stream or by applying tackifiers, such as oils, to the fibers of the blanket to which dust particles in the air or gas stream adhere.

The "dust or dirt-holding capacity" of the fibrous filtration layer 22 is the weight of dust particles, in grams, that causes the two foot square section of fibrous filtration layer 22 being tested to have a one inch of water column pressure drop across its thickness. The "dust or dirt-holding capacity" of composite filter media 20 is the weight of dust particles, in grams, that causes the two foot square section of composite filter media being tested to have a one inch of water column pressure drop across its thickness.

The thicknesses of the fibrous filtration layers 22 set forth in this specification are measured by placing a one foot square 630 gram weight on a one foot square section of the fibrous filtration layer 22 and measuring the thickness of the fibrous filtration layer 22 when compressed by the weight.

As shown in FIG. 1, a first embodiment the composite filter media 20 of the present invention includes the fibrous filtration layer 22 of randomly oriented fibers which are preferably air laid; the flexible covering layer 24; and the pleatable stiffening layer 26. The fibrous filtration layer 22 is located intermediate and is bonded to the flexible covering layer 24 and the pleatable stiffening layer 26. The flexible covering layer 24 is located on the downstream side of the composite filter media 20 and functions as a barrier layer to block the loss of fibers from the composite filter media 20 as a fluid being filtered passes through the composite filter media 20. The pleatable stiffening layer 26 is located on the upstream side of the composite filter media 20 and provides the formability and stiffness required for the composite filter media 20 to be scored and pleated and retain its pleats. Preferably, the pleatable stiffening layer 26 also enhances the dirt-holding capacity of the composite filter media 20.

FIG. 2 shows a second embodiment the composite filter media 20 of the present invention which includes the fibrous filtration layer 22 of randomly oriented fibers which are preferably air laid; the flexible covering layer 24; and the pleatable stiffening layer 26. The fibrous filtration layer 22 is located intermediate and is bonded to the flexible covering layer 24 and the pleatable stiffening layer 26. The flexible covering layer 24 is located on the upstream side of the composite filter media 20 and functions as a barrier layer to block the loss of fibers from the composite filter media 20. The pleatable stiffening layer 26 is located on the downstream side of the composite filter media 20 and provides the formability and stiffness required for the composite filter media 20 to be scored and pleated and to retain its pleats. In selected embodiments, the pleatable stiffening layer may also function as a barrier layer to block the loss of fibers from the composite filter media 20 as a fluid being filtered passes through the composite filter media 20.

In the embodiment of the composite filter media 20 shown in FIG. 3, the fibrous filtration layer 22 of randomly oriented fibers (which are preferably air laid) is the upstream layer of the composite filter media and the pleatable stiffening layer 26 is the downstream layer of the composite filter media. Since the pleatable stiffening layer 26 is located on and bonded to the downstream side of the composite filter media 20, the pleatable stiffening layer 26 functions primarily to provide the composite filter media 20 with the formability and stiffness required for the composite filter media to be scored and pleated and to retain its pleats. Preferably, the pleatable stiffening layer 26 also functions as a barrier to block the loss of fibers from the fibrous filtration layer 22 as a fluid being filtered passes through the composite filter media 20.

In the embodiment of the composite filter media 20 shown in FIG. 4, the fibrous filtration layer 22 of randomly oriented fibers (which are preferably air laid) is the upstream layer of the composite filter media 20; the flexible covering layer 24 is the downstream layer of the composite filter media 20; and the pleatable stiffening layer 26 is located intermediate and bonded to both the fibrous filtration layer 22 and the flexible covering layer 24. Since the flexible covering layer 24 is located on the downstream side of the composite filter media 20, the flexible covering layer 24 functions as a barrier to block the loss of fibers from the composite filter media 20 as a fluid being filtered passes through the composite filter media 20. Since the pleatable stiffening layer 26 is located on the downstream side of the fibrous filtration layer 22, the pleatable stiffening layer 26 functions primarily to provide the composite filter media 20 with the formability and stiffness required for the composite filter media 20 to be scored and pleated and to retain its pleats.

In the embodiment of the composite filter media 20 shown in FIG. 5, a first pleatable stiffening layer 26 is the upstream layer of the composite filter media 20; the flexible covering layer 24 is the downstream layer of the composite filter media 20; and the fibrous filtration layer 22 of randomly oriented fibers (which are preferably air laid) and a second pleatable stiffening layer 26 (with the second pleatable stiffening layer downstream of the fibrous filtration layer 22) are located intermediate and bonded to each other and to the upstream pleatable stiffening layer 26 and the flexible covering layer 24 respectively. Since the flexible, covering layer 24 is located on the downstream side of the composite filter media 20, the flexible covering layer 24 functions to block the loss of fibers from the composite filter media 20 as a fluid being filtered passes through the composite filter media 20. Since the upstream pleatable stiffening layer 26 is located on the upstream side of the composite filter media 20, the upstream pleatable stiffening layer preferably functions to both enhance the dirt-holding capacity of the composite filter media 20 and, along with the downstream pleatable stiffening layer 26, to provide the composite filter media 20 with the formability and stiffness required for the composite filter media 20 to be scored and pleated and to retain its pleats.

In the embodiment of the composite filter media 20 shown in FIG. 6, a first pleatable stiffening layer 26 is the upstream layer of the composite filter media 20; a second pleatable stiffening layer 26 is the downstream layer of the composite filter media 20; and the fibrous filtration layer 22 of randomly oriented fibers (which are preferably air laid) is located intermediate and bonded to both of the pleatable stiffening layers 26. Either one of the pleatable stiffening layers or both of the pleatable stiffening layers 26 provide the composite filter media 20 with the formability and stiffness required for the composite filter media 20 to be scored and pleated and to retain its pleats. Preferably, the upstream stiffening layer also functions to increase the dirt-holding capacity of the composite filter media 20. While the downstream pleatable stiffening layer 26 functions primarily to provide, along with the upstream pleatable stiffening layer 26, the formability and stiffness required for the composite filter media 20 to be scored and pleated and to retain its pleats, the downstream pleatable stiffening layer may also function as a barrier layer to block the loss of fibers from the fibrous filtration layer 22 as a fluid being filtered passes through the composite filter media 20.

Figure 9:
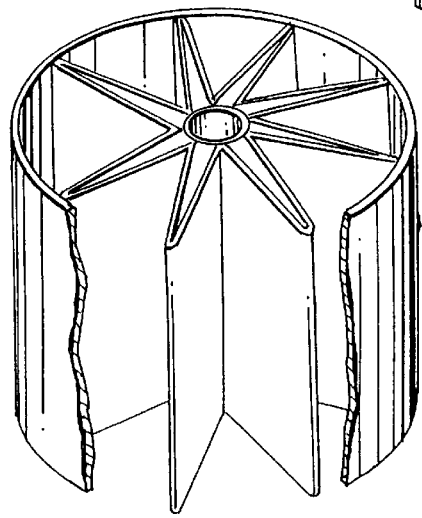
FIG. 9 is a schematic perspective view, with a portion broken away, of a pleated engine oil filter using the composite filter media of the present invention.

FIGS. 7, 8 and 9 show the composite filter media 20 of the present invention, after it has been pleated, in three different applications. In FIG. 7, the pleated, composite filter media 30 is used as the filter media in a vehicle passenger compartment air filter. In FIG. 8, the pleated, composite filter media 32 is used as the filter media in an engine air filter. In FIG. 9, the pleated, composite filter media 34 is used as the filter media in an engine oil filter. Thus, the pleatable composite filter media 20 of the present invention can be used in many applications where pleated filter media is required.

As shown in FIG. 10, the pleated filter media, e.g. 30, 32 and 34, have pleats 70 including pleat portions 74 extending between creases or scores 76. The pleats 70 can be uniform or vary in size and the included angle or angles 72 between the pleat portions 74 of the pleats 70 can be uniform or vary in size.

Figure 11:
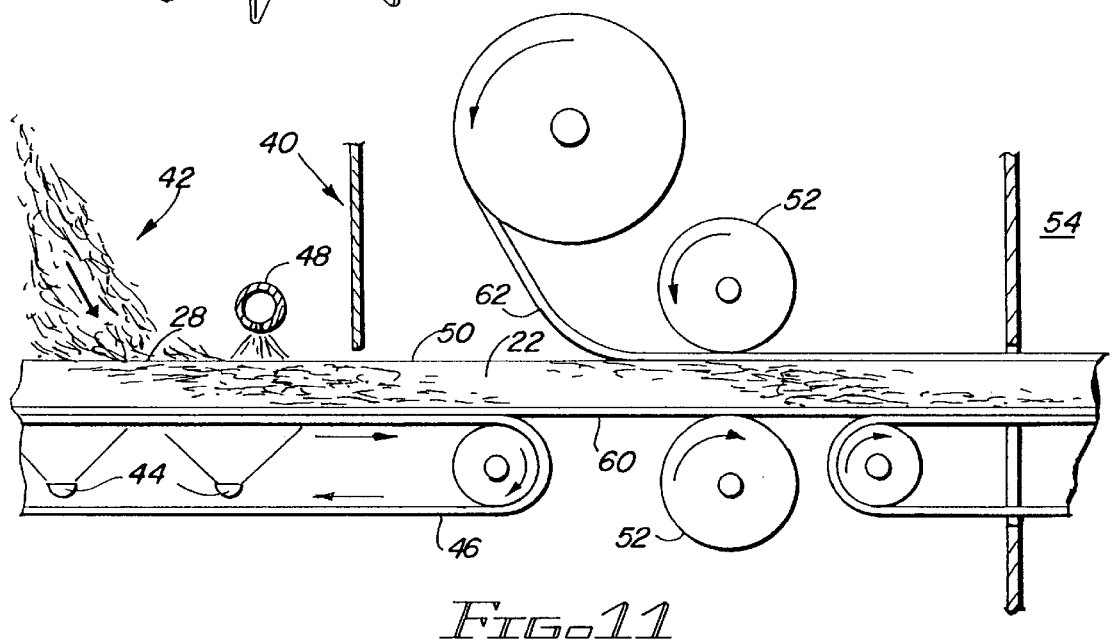
FIG. 11 is schematic view of a portion of a production line for forming the composite filter media of the present invention.

FIG. 11 shows a partial schematic view of a production line for making the composite filter media 20 of the present invention by a preferred method. FIG. 11 shows the downstream end of a collection chamber 40 with the fibrous filtration layer 22 exiting the collection chamber 40 on a backing sheet 60 which can be: i) a flexible covering layer 24; ii) a pleatable stiffening layer 26; or iii) a laminate of a flexible covering layer 24 and a pleatable stiffening layer 26. The fibrous filtration layer 22 has been collected on the backing layer 60 in an air-laid process wherein fibers 42 produced by a flame attenuation fiberization process or other fiberization processes are drawn through a mist of binder formed by binder application nozzles and to the backing layer 60 by suction means 44 located beneath the collection chain conveyor 46. As the suction means 44 draws air through the backing layer 60 and the collection chain conveyor 46, the fibers of the fibrous filtration layer 22 are drawn to the backing layer 60 and deposited or collected thereon with the finer diameter fibers being collected at and adjacent the backing layer 60 and the coarser diameter fibers being collected at and adjacent the upstream surface 28 of the fibrous filtration layer 22 to form a fibrous layer having a graduated mean fiber diameter that increases from the downstream surface adjacent the backing layer 60 to the upstream surface 28. The fibrous filtration layer 22 of randomly oriented fibers 42, thus formed, also has a graded density from a less dense portion made up of predominately coarser diameter fibers at and adjacent the upstream surface 28 to a more dense portion made up of predominately finer diameter fibers at and adjacent the backing layer 60. As discussed above, the less dense portion of coarser fibers at and adjacent the upstream surface 28 of the fibrous filtration layer 22 increases the dirt-holding capacity of the fibrous filtration layer 22 and the more dense portion of finer diameter fibers at and adjacent the backing sheet 60 increases the filtration efficiency of the fibrous filtration layer 22.

The backing sheet 60 functions as a collection membrane to block fiber losses through the collection chain conveyor 46 so that substantially no fibers are lost by being drawn through the collection chain conveyor 46.

As the fibrous filtration layer 22 is about to exit the collection chamber 40, a thin coating 50 of additional binder is normally applied to the upstream surface 28 of the fibrous filtration layer 22 by a series of spray nozzles 48 which extend across the collection conveyor 46 and spray ultra-fine droplets of binder (e.g. less than 20 microns in diameter) toward the collection conveyor 46. The use of ultra-fine binder droplets prevents the fibrous filtration layer 22 from collapsing under the suction of the suction means 44. If the binder droplets are too large, the suction acting on these droplets causes an uncured fibrous filtration layer 22 to collapse under the pressure caused by the suction on the droplets. A collapsed fibrous filtration layer 22 generates a higher pressure drop across the fibrous filtration layer 22 which reduces the service life of a composite filter media made with such a fibrous filtration layer.

As the uncured fibrous filtration layer 22 exits the collection chamber 40 on the backing sheet 60, an upstream layer 62 of the composite filter media 20, which may be a pleatable stiffening layer 26 or a flexible covering layer 24, is applied to the upstream surface 28 of the fibrous filtration layer 22 on the thin coating 50 of binder just deposited on the upstream surface 28 by the spray nozzles 48. The composite filter media 20 is then passed between sear rolls 52 where the final thickness of the composite filter media 20 is set and a conventional curing oven 54 where the curing of the composite filter media 20 is completed. The temperature of the sear rolls 52 and the curing oven 54 depends on the binder curing requirements. For low curing temperature latex binders, the curing temperature of the sear rolls 52 and curing oven 54 can be about 350° F. or less (high enough to remove the water from the binder). For other high curing temperature binders, the curing temperature of the sear rolls 52 and the curing oven 54 can be about 400° F. or greater such as the 450° F. temperature generally required to cure standard phenolic binders.

Since the spacing between the sear rolls 52 sets the thickness of the composite filter media 20, e.g. a spacing of 0.1 inches between the cylindrical surfaces of the sear rolls forms a thin composite filter media 20 having a thickness of about 0.1 inches, the thickness of the composite filter media 20 can be held at a selected thickness by maintaining the spacing between the cylindrical surfaces at a selected spacing. To change the thickness of the composite filter media 20, the spacing between the cylindrical surfaces of the sear rolls is either reduced or increased.

Where the backing layer 60 includes a pleatable stiffening layer 26 as well as a flexible covering layer 24, a binder or adhesive coating, of the types discussed above, intermediate the pleatable stiffening layer 26 and flexible covering layer 24 bonds these layers together as the composite is passed through the sear rolls 52 and the curing oven 54. The spacing between the cylindrical surfaces of the sear rolls sets the thickness of the composite filter media 20 shown in FIGS. 1–6.

The composite filter media 20 thus formed can be scored and pleated or folded back upon itself to form a pleated composite filter media, e.g. pleated composite filter media 30, 32 and 34, which will retain its pleats. The pleated composite filter media is typically formed by passing the composite filter media 20 through a conventional pleating process where the composite filter media 20 is scored and pleated or folded back upon itself to selected degrees to form a pleated filter media, e.g. 30, 32 and 34, having pleats 70 of a selected size or sizes and a selected included angle or angles 72 between the pleat portions 74 extending between the scores 76. The included angles 72 between the portions 74 of the pleats 70 can be uniform or vary and the size of the pleats 70 can be uniform or vary. Since the fibrous filtration layer 22 and, if used, the flexible covering layer 24 are too flexible to retain a pleated configuration, the pleatable stiffening layer or layers 26 of the composite filter media are sufficiently stiff to retain the composite filter media 20 in the pleated configuration set by the pleating operation while being sufficiently formable that the pleatable stiffening layers 26 do not fracture or fail at the scores 76 when composite filter media 20 is folded back upon itself to form the pleats 70.

As stated above, the pleats 70 can be formed in the composite filter media 20 by various conventional pleating operations, including but not limited to, rotary pleating, push bar pleating, star gear pleating and pleating using a MINI-PLEATER pleater. If desired for certain pleating operations, the composite filter media can be reheated prior to the pleating operation to facilitate the scoring of the composite filter media 20 and the formation of the pleats 70.

In a composite filter media 20 wherein the fibrous filtration layer 22 is collected on the covering layer 24 and the mean fiber diameter of the fibers in fibrous filtration layer 22 increases throughout the thickness of the fibrous filtration layer from adjacent the covering layer 24 to the pleatable stiffening layer 26 (the finer fibers are adjacent the covering layer 24 and the mean diameter of the fibers becomes progressively greater in the direction of the pleatable stiffening layer 26 with the coarser fibers adjacent the pleatable stiffening layer 26), the dirt-holding capacity of the composite filter media 20 can be increased by using a pleatable stiffening layer 26 having a thickness of 0.020 inches or greater and a permeability of 500 cfm/ft$^2$ or greater (a Frasier Air Permeability of 500 or greater) as the upstream layer of the composite filter media. Composite #1 of FIG. 13 is an example of such a composite filter media. When pleatable stiffening layers 26 less than 0.020 inches in thickness and having permeabilities of less than 500 cfm/ft$^2$ are used in such a composite filter media 20, these thin, relatively low permeability pleatable stiffening layers do not appreciably enhance the dirt-holding capacity of such a composite filter media (even when used as the upstream layer of the composite filter media). The better dirt-holding capacity of these composite filter media, experienced with these pleatable stiffening layers 26 as the upstream layer, is basically attributable to the coarser fibers of the fibrous filtration layer 22 and not to the pleatable stiffening layer 26. Composite #3 of FIG. 13 is an example of this type of composite filter media.

In composite filter media 20 wherein the fibrous filtration layer 22 is collected on the pleatable stiffening layer 26 and the mean fiber diameter of the fibers in fibrous filtration layer 22 increases throughout the thickness of the fibrous filtration layer from adjacent the pleatable stiffening layer 26 to the covering layer 24 (the finer fibers are adjacent the pleatable stiffening layer 26 and the mean diameter of the fibers becomes progressively greater in the direction of the covering layer 24 with the coarser fibers adjacent the covering layer 24), the dirt-holding capacity of the composite filter media 20 can be substantially equalized for filtration through the composite filter media in either direction by collecting the fibrous filtration layer 22 on a pleatable stiffening layer 26 having a thickness of 0.020 inches or greater and a permeability of 500 cfm/ft$^2$ or greater (a Frasier Air Permeability of 500 or greater). Composite #2 of FIG. 13 is an example of such a composite filter media. When using such a composite filter media, with the covering layer 24 as the upstream layer, the coarser fibers of the fibrous filtration layer 22 filter out the larger particles to keep the finer fiber more dense portion of the fibrous filtration layer from becoming prematurely loaded.

When using such a composite filter media with the stiffening layer 26 as the upstream layer, the coarse fibers of the pleatable stiffening layer filter out the larger particles to keep the finer fiber more dense portion of the fibrous filtration layer 22 from becoming prematurely loaded. Pleatable stiffening layers 26 less than 0.020 inches in thickness and having permeabilities of less than 500 cfm/ft$^2$ do not appreciably enhance the dirt-holding capacity of such a composite filter media when used as the upstream layer of the composite filter media. Composite #4 is an example of such a composite filter media.

FIG. 13 compares, for four different composite filter media 20, the dirt-holding capacity of the composite filter media when the stiffening layer 26 of the composite filter media is the upstream layer of the composite filter media relative to the dirt-holding capacity of the composite filter media 20 when the stiffening layer 26 is the downstream layer of the composite filter media 20. In composites #1 and #3, the fibrous filtration layer 22 is collected on the covering layer 24 with the mean diameter of the fibers in the fibrous filtration layer 22 increasing throughout the thickness of the fibrous filtration layer from adjacent the covering layer 24 to the pleatable stiffening layer 26 (the finer fibers are adjacent the covering layer 24 and the mean diameter of the fibers becomes progressively greater in the direction of the pleatable stiffening layer 26 with the coarser fibers adjacent the pleatable stiffening layer 26). In composites #2 and #4, the fibrous filtration layer 22 is collected on the pleatable stiffening layer 26 with the mean diameter of the fibers in the fibrous filtration layer 22 increasing throughout the thickness of the fibrous filtration layer from adjacent the pleatable stiffening layer 26 to the covering layer 24 (the finer fibers are adjacent the pleatable stiffening layer 26 and the mean diameter of the fibers becomes progressively greater in the direction of the covering layer 26 with the coarser fibers adjacent the covering layer 24). The mean diameter of the fibers of the fibrous filtration media 22 in composites #1 to #4 are between about $3.0\times10^{-5}$ to about $11.0\times10^{-5}$ inches.

In composite #1, the stiffening layer 26 has a thickness of 0.032 inches; has a permeability of 630 cfm/ft$^2$; and is located adjacent the coarse fiber less dense side of the fibrous filtration layer 22. Composite #1 holds 1.5 times the amount of dirt with the stiffening layer 26 of the composite as the upstream layer of the composite as compared with the stiffening layer 26 being the downstream layer of the composite. In composite #1, with the stiffening layer 26 adjacent the coarser fiber less dense side of the fibrous filtration layer 22, the thickness and permeability of the stiffening layer 26 in composite #1, enable the stiffening layer 26 of that composite to enhance the dirt-holding capacity of the composite filter media. An advantage associated with this composite is the maximizing of the dirt-holding capacity of composite filter media 20.

In composite #2, the stiffening layer 26 has a thickness of 0.032 inches; has a permeability of 630 cfm/ft$^2$; and is located adjacent the fine fiber more dense side of the fibrous filtration layer 22. Composite #2 holds 1.1 times the amount of dirt with the stiffening layer 26 of the composite as the upstream layer of the composite as compared with the stiffening layer 26 being the downstream layer of the composite (the dirt holding capacity of the composite is about the same with the pleatable stiffening layer as the upstream layer or the downstream layer). In composite #2, with the stiffening layer 26 adjacent the finer fiber more dense side of the fibrous filtration layer 22, the coarse fiber less dense side of the fibrous filtration layer 22 provides the dirt-holding capacity required for the composite filter media 20 when the pleatable stiffening layer is located on the downstream side of the composite filter media. In composite #2, with the pleatable stiffening layer 26 as the upstream layer of the composite filter media, the thickness and permeability of the stiffening layer 26 in composite #2, enable the stiffening layer 26 of that composite to provide the required dirt-holding capacity for the composite filter media. An advantage associated with this composite is the ability to use this composite filter media 20 with either side as the upstream side of the filter media.

In composite #3, the stiffening layer 26 has a thickness of 0.013 inches; has a permeability of 265 cfm/ft$^2$; and is located adjacent the coarse fiber less dense side of the fibrous filtration layer 22. Composite #3 holds 1.3 times the amount of dirt with the stiffening layer 26 of the composite as the upstream layer of the composite as compared with the stiffening layer 26 being the downstream layer of the composite. In composite #3, the thinness and low permeability of the stiffening layer 26 do not enhance the dirt-holding capacity of the composite filter media. However, since the stiffening layer is adjacent the coarser fiber less dense side of the fibrous filtration layer 22, with the pleatable stiffening layer 26 as the upstream layer of the composite, the coarser fiber less dense side of the fibrous filtration layer 22 provides the dirt holding capacity. With the pleatable stiffening layer 26 as the downstream layer of the composite, the finer fiber more dense side of the fibrous filtration layer 22 becomes the upstream side of the fibrous filtration layer. Since this side of the fibrous filtration layer 22 is more easily clogged by large dirt particles, the dirt-holding capacity of the composite filter media is reduced. Thus, with respect to its dirt-holding capacity, composite #3 should be used with the pleatable stiffening layer 26 on the upstream side of the composite filter media.

In composite #4, the stiffening layer 26 has a thickness of 0.015 inches; has a permeability of 390 cfm/ft$^2$; and is located adjacent the fine fiber more dense side of the fibrous filtration layer 22. Composite #4 holds 0.7 times the amount of dirt with the stiffening layer 26 of the composite as the upstream layer of the composite as compared with the stiffening layer 26 being the downstream layer of the composite (the dirt holding capacity of the composite is significantly greater with the pleatable stiffening layer as the downstream layer). In composite #4, with the stiffening layer 26 adjacent the finer fiber more dense side of the fibrous filtration layer 22, the coarse fiber less dense side of the fibrous filtration layer 22 provides the dirt-holding capacity required for the composite filter media 20 when the pleatable stiffening layer is located on the downstream side of the composite filter media. In composite #4, with the pleatable stiffening layer 26 as the upstream layer of the composite filter media, the thinness and low permeability of the stiffening layer 26 in composite #4, do not enable the stiffening layer 26 of that composite to provide the required dirt-holding capacity for the composite filter media. Since the fine fiber more dense side of the fibrous filtration layer 22 is more easily clogged by large dirt particles, with the finer fiber more dense side of the fibrous filtration layer 22 as the upstream side of the fibrous filtration layer 22 in the composite #4, the dirt-holding capacity of the composite filter media is reduced. Thus, with respect to its dirt-holding capacity, composite #4 should be used with the pleatable stiffening layer 26 on the downstream side of the composite filter media.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A filter comprising:
   a pleated composite filter media; said pleated composite filter media including a fibrous filtration layer of randomly oriented glass fibers bonded together at their points of intersection; said fibrous filtration layer comprising an air laid blanket of glass fibers having an average mean diameter between $3.0 \times 10^{-5}$ inches and $11.0 \times 10^{-5}$ inches; said fibrous filtration layer having an initial pressure drop no greater than about 0.30 inches of water; said fibrous filtration layer having an average filtration efficiency of at least 20%; said fibrous filtration layer having a dust holding capacity of at least 6 grams; and said fibrous filtration layer lacking sufficient formability and stiffness in of itself to be scored and reformed into a pleated configuration and to retain said pleated configuration;

pleatable, permeable stiffening layer means; said stiffening layer means comprising a first pleatable, permeable stiffening layer having sufficient ductility and stiffness to be reformed into a pleated configuration and to retain said pleated configuration;

a flexible, permeable covering layer for blocking a loss of fibers from said fibrous filtration layer during passage of a fluid through said pleated composite filter media; and said fibrous filtration layers said stiffening layer means, and said covering layer being bonded together with said fibrous filtration layer intermediate said first pleatable stiffening layer and said covering layer; and said composite filter media in of itself having sufficient formability and stiffness to be reformed into a pleated configuration and retain said pleated configuration.

2. The filter according to claim 1, wherein: the mean fiber diameter of the fibers in said fibrous filtration layer increases and the density of said fibrous filtration layer decreases from a first major surface of said fibrous filtration layer adjacent said covering layer to a second major surface of said fibrous filtration layer adjacent said first pleatable stiffening layer; and said pleatable stiffening layer has a thickness of at least 0.020 inches and a permeability of at least 500 cfm/ft$^2$.

3. The filter according to claim 1, wherein: the mean fiber diameter of the fibers in said fibrous filtration layer increases and the density of said fibrous filtration layer decreases from a first major surface of said fibrous filtration layer adjacent said first pleatable stiffening layer to a second major surface of said fibrous filtration layer adjacent said covering layer; and said pleatable stiffening layer has a thickness of at least 0.020 inches and a permeability of at least 500 cfm/ft$^2$.

4. The filter according to claim 1 wherein: said fibers of said fibrous filtration layer are bonded together and said pleatable, permeable stiffening means is bonded to said fibrous filtration layer by a phenolic resin binder.

5. The filter according to claim 1, wherein: said fibers of said fibrous filtration layer are bonded together and said pleatable, permeable stiffening means is bonded to said fibrous filtration layer by an acrylic latex binder.

6. A filter comprising:
   a pleated composite filter media; said pleated composite filter media including a fibrous filtration layer of randomly oriented glass fibers bonded together at their points of intersection; said fibrous filtration layer comprising an air laid blanket of glass fibers having an average mean diameter between $3.0 \times 10^{-5}$ inches and $11.0 \times 10^{-5}$ inches; said fibrous filtration layer having an initial pressure drop no greater than about 0.30 inches of water; said fibrous filtration layer having an average filtration efficiency of at least 20%; said fibrous filtration layer having a dust holding capacity of at least 6 grams; and said fibrous filtration layer lacking sufficient formability and stiffness in of itself to be scored and reformed into a pleated configuration and to retain said pleated configuration;
   pleatable, permeable stiffening layer means; said stiffening layer means comprising first and second pleatable, permeable stiffening layers and having sufficient ductility and stiffness to be reformed into a pleated configuration and to retain said pleated configuration; and
   said fibrous filtration layer, said first pleatable stiffening layer, and said second pleatable stiffening layer being bonded together with said fibrous filtration layer intermediate said first pleatable stiffening layer and said second pleatable stiffening layer; and said composite filter media in of itself having sufficient formability and stiffness to be reformed into a pleated configuration and retain said pleated configuration.

7. The filter according to claim 6, including: a covering layer for blocking a loss of fibers from said fibrous filtration layer; said second pleatable stiffening layer being intermediate said fibrous filtration layer and said covering layer and bonded directly to said fibrous filtration layer; and said covering layer being bonded directly to said second pleatable stiffening layer.

8. The filter according to claim 6, wherein: said first and second pleatable, permeable stiffening layers each having sufficient formability and stiffness to be reformed into a pleated configuration and to retain said pleated configuration.

* * * * *